US010708268B2

(12) United States Patent
Xuan et al.

(10) Patent No.: US 10,708,268 B2
(45) Date of Patent: Jul. 7, 2020

(54) MANAGING VOICE APPLICATIONS WITHIN A DIGITAL WORKSPACE

(71) Applicant: VMware, Inc., Palo Alto, CA (US)

(72) Inventors: Chaoting Xuan, Duluth, GA (US); Kar-Fai Tse, Peachtree Corners, GA (US); Suyu Pan, Atlanta, GA (US)

(73) Assignee: AirWatch, LLC, Atlanta, GA (US)

( * ) Notice: Subject to any disclaimer, the term of this patent is extended or adjusted under 35 U.S.C. 154(b) by 179 days.

(21) Appl. No.: 15/664,215

(22) Filed: Jul. 31, 2017

(65) Prior Publication Data
US 2019/0036923 A1 Jan. 31, 2019

(51) Int. Cl.
H04L 29/06 (2006.01)
H04L 29/08 (2006.01)

(52) U.S. Cl.
CPC .......... H04L 63/0884 (2013.01); H04L 63/08 (2013.01); H04L 63/083 (2013.01); H04L 63/20 (2013.01); H04L 67/141 (2013.01); H04L 67/20 (2013.01); H04L 67/2804 (2013.01); H04L 67/2814 (2013.01); H04L 67/327 (2013.01)

(58) Field of Classification Search
CPC ... H04L 63/0884; H04L 63/20; H04L 63/083; H04L 67/2814; H04L 67/20; H04L 63/08; H04L 67/141; H04L 67/327; H04L 67/2804
USPC .......................................................... 726/7
See application file for complete search history.

(56) References Cited

U.S. PATENT DOCUMENTS

| 9,659,068 | B1* | 5/2017 | Mattsson | G06F 16/24578 |
| 2007/0220588 | A1* | 9/2007 | Panda | H04L 12/1403 726/1 |
| 2007/0294209 | A1* | 12/2007 | Strub | H04L 63/102 |
| 2011/0004878 | A1* | 1/2011 | Divoux | G06F 9/4856 718/1 |
| 2013/0019283 | A1* | 1/2013 | Rice | H04L 63/20 726/4 |
| 2014/0249817 | A1* | 9/2014 | Hart | G10L 15/22 704/239 |
| 2016/0012427 | A1* | 1/2016 | Van Heerden | H04L 63/0853 705/44 |
| 2016/0226920 | A1* | 8/2016 | Ansari | H04L 63/10 |
| 2016/0241933 | A1* | 8/2016 | Harrison | H04L 63/10 |
| 2016/0269376 | A1* | 9/2016 | Goyal | G06F 21/62 |

(Continued)

Primary Examiner — Aravind K Moorthy
(74) Attorney, Agent, or Firm — Thomas Horstemeyer, LLP

(57) ABSTRACT

Disclosed are various embodiments for managing voice-driven application. In one embodiment, among others, a system includes a computing device and program instructions. The program instructions can cause the computing device to receive a request to initiate an application proxy service. The program instructions can cause the computing device to authenticate the request based on an access token. The program instructions can cause the computing device to initiate an application proxy service session with a second computing device, where the second computing device provides input data to the application proxy service. The computing device can also initiate an application session associated with an application service, where the application proxy service provides the input data to the application service. The computing device also can apply a compliance policy as data is communicated between the second computing device and the application service.

20 Claims, 5 Drawing Sheets

(56) References Cited

U.S. PATENT DOCUMENTS

| | | | |
|---|---|---|---|
| 2016/0366183 A1* | 12/2016 | Smith | H04L 63/06 |
| 2017/0095740 A1* | 4/2017 | Zhang | G06F 3/167 |
| 2017/0187547 A1* | 6/2017 | Kleingeld-MacKenzie | H04L 12/4633 |
| 2017/0272543 A1* | 9/2017 | Lo | H04N 21/41407 |
| 2017/0353436 A1* | 12/2017 | Jurss | H04L 63/1416 |
| 2017/0359186 A1* | 12/2017 | Atarius | H04L 12/1407 |
| 2018/0007060 A1* | 1/2018 | Leblang | H04L 63/105 |
| 2018/0034811 A1* | 2/2018 | Meng | H04L 63/0815 |
| 2018/0089407 A1* | 3/2018 | Watson | G10L 17/24 |
| 2018/0225079 A1* | 8/2018 | Kotteri | G06F 3/162 |
| 2018/0262497 A1* | 9/2018 | Raje | H04L 63/0823 |
| 2018/0302407 A1* | 10/2018 | Sekaran | H04L 63/10 |
| 2018/0325469 A1* | 11/2018 | Fountaine | H04W 4/90 |
| 2019/0013019 A1* | 1/2019 | Lawrence | G10L 15/22 |

* cited by examiner

MANAGING VOICE APPLICATIONS WITHIN A DIGITAL WORKSPACE

BACKGROUND

With the emergence of voice-driven applications, users are able to provide verbal instructions to client devices to perform various tasks, such as dictating a hands free text message, ordering vehicle transportation, instructing home automation devices, requesting weather forecasts, and dictating a shopping list. Voice-driven applications are also being developed for use in corporate settings. Voice-driven applications can be used to query calendar events, query corporate reports, and chat with co-workers through chat applications. However, these voice applications can potentially pass sensitive corporate data outside a company's data security protocols.

Typically, devices such as laptops, tablets, and mobile phones, are required to abide by enterprise policies. Prior to an employee using his or her own device in the workplace, a company can require the employee to enroll their client device with a management service capable of protecting enterprise data from theft, loss, and unauthorized access. Administrators of the management service can utilize the management service to oversee operation of the devices enrolled with or otherwise managed by the service.

A device can interact with a management service through an agent application. For instance, the agent application can oversee the safe installation and execution of other types of applications, such as word processing applications, spreadsheet applications, or other applications. However, devices configured to process voice commands, such as smart speakers, mobile devices, and virtual assistant devices, are not managed by enterprise policies.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
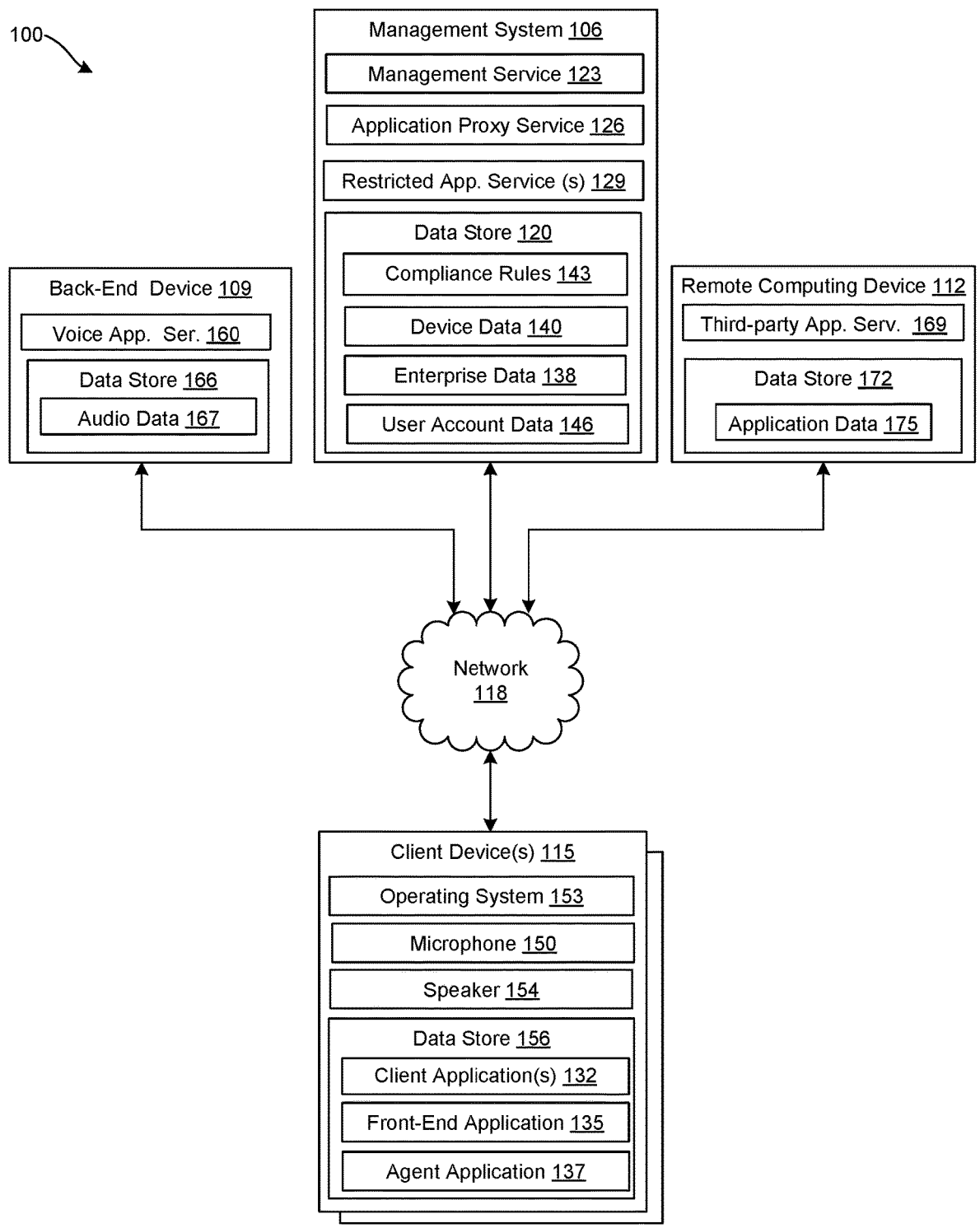
FIG. 1 is a drawing of an example of a networked environment, including a management system, a back-end computing device, a remote computing device, and a client device.

The present disclosure relates to an enterprise management of voice-driven applications. Voice-driven applications executed on devices, such as smart speakers, mobile phones, and virtual assistant devices, are not managed by enterprise policies. Some examples of voice-driven applications executed on client devices include Google's Assistant™, Amazon's Alexa™, Apple's Siri™, Microsoft's Cortana™, or other suitable personal assistant client-side applications. These voice-driven applications executed on client devices are in communication with a back-end server device to process the verbal instructions and/or questions.

In addition, voice-driven applications are emerging for use in corporate settings as well. For example, a voice-driven application can be used to query calendar events, query corporate reports, and chat with co-workers about sensitive project developments through messaging applications. However, these voice applications can potentially pass sensitive enterprise data outside a company's data security protocols.

Various embodiments of the present disclosure relate to an application proxy service that manages data communicated between a voice back-end device that processes audio input captured by a client device and a voice application service that executes an application task based on the audio input. The execution of the application task generates a response that is transmitted back to the client device in audio form. As a non-limiting example, a voice-driven computing environment can comprise a front-end client device, a voice back-end device, and one or multiple voice applications. When a user interacts with the voice-driven computing environment, his or her voice is received as audio input by the front-end client device, which can have a microphone and a speaker. The audio input can be passed to the voice back-end device, and the voice back-end device can use a Speech Recognition (SR) technique to convert the audio input to text. The voice back-end device can employ a Natural Language Understanding (NLU) technique to translate the text to a semantic instruction, which is referred to as an Intent by some virtual assistant services. Then, a voice application service can be invoked to process the semantic instruction and generate a response as text output. The voice back-end device can parse the text output using a Text-to-Speech (TTS) technique to produce a voice output, which is sent back to the front-end client device for playback through its speakers.

In one embodiment, among others, a management system can execute program instructions that causes the management system to receive, over a network, a request from a back-end computing device to initiate an application proxy service, the request being routed to the application proxy service based at least in part on an audio input received by the back-end computing device. The program instructions can cause the management system initiate an application proxy service session with the back-end computing device for the application proxy service and identify a user account associated with the application proxy service session based at least in part on the request comprising the user account or a device identifier associated with a client device.

Further, the program instructions can cause the management system to authenticate the user account and/or the request based on an access token included within the request. The application service can execute a command associated with the request. In addition, program instructions cause the management system to apply a compliance policy as data is communicated between the back-end computing device and the application service, where the data is communicated through the application proxy service session and the application session.

With reference to FIG. 1, shown is an example of a networked environment 100. The networked environment can include a management system 106, a back-end device 109, a remote computing device 112, and client device(s) 115 in communication with one another over a network 118. The management system 106 can provide an enterprise with access to email, corporate documents, social media, and other enterprise content. The management system 106 also executes restricted voice application services, which executes tasks requested by the audio instructions while abiding by a compliance policy arranged by an enterprise.

The back-end device 109 can execute a voice service application that processes personal assistant audio instructions captured by the client device 115 and directs the audio instructions to an appropriate application service to execute a task requested in the audio instructions. The remote computing device 112 executes third-party application services, which executes tasks requested by the audio instructions. The client device 115 is a front-end device that receives an audio input of instructions from the user, such as a smart speaker, a mobile device, a tablet computer, and other suitable devices that include a microphone for receiving audio instructions. The client device 115 can also have a speaker for playback of audio output transmitted from the voice application service.

The network 118 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, cellular networks, telephony networks, and other types of networks.

The management system 106 can include a server computer or any other system providing computing capability. Alternatively, the management system 106 can include a plurality of computing devices that are arranged, for example, in one or more server banks, computer banks, or other arrangements. The management system 106 can include a grid computing resource or any other distributed computing arrangement. The computing devices can be located in a single installation or can be distributed among many different geographical locations. The management system 106 can also include or be operated as one or more virtualized computer instances. For purposes of convenience, the management system 106 is referred to in the singular. Even though the management system 106 is referred to in the singular, it is understood that a plurality of management systems 106 can be employed in the various arrangements as described above. As the management system 106 communicates with the client device 115, the back-end device 109, and the remote computing device 112 remotely over the network 118, the management system 106 can be described as a remote management system 106 or a collection of one or more remote computing devices.

The management system 106 can include a data store 120. The data store 120 can include memory of the management system 106, mass storage resources of the management system 106, or any other storage resources on which data can be stored by the management system 106. The data store 120 can include one or more databases, such as a structured query language (SQL) database, a non-SQL database, or other appropriate database. The data stored in the data store 120, for example, can be associated with the operation of the various applications or functional entities described below.

The components executed on the management system 106 can include, for example, a management service 123, an application proxy service 126, restricted application service(s) 129, as well as other applications, services, processes, systems, engines, or functionality not discussed in detail herein. The management service 123 can be executed to oversee the operation of client devices 115 enrolled (or to be enrolled) with the management service 123.

In some embodiments, an enterprise, such as one or more companies or other organizations, can operate the management service 123 to oversee or manage the operation of the client devices 115 of its employees, contractors, customers, students, or other users having user accounts with the enterprise. An enterprise can be any customer of the management service 123, and such an enterprise can also be referred to as an organization. The enterprise or organization can have a hierarchy. A hierarchy can be an organizational structure that links the individuals and/or groups in the enterprise. For example, an individual or group can be responsible for management of one or more subordinate individuals or groups, who can in turn be responsible for management of one or more subordinate individuals or groups, and so on.

The management service 123 can cause various software components to be installed on the client device 115. Such software components can include, for example, client application(s) 132, a front-end application 135, an agent application 137, resources, libraries, drivers, or other similar components that require installation on the client device 115 as specified by an administrator of the management service 123. The management service 123 can further cause policies to be implemented on the client device 115. Policies can include, for example, restrictions or permissions pertaining to capabilities of a client device 115 such that access to enterprise data 138 is secured on the client device 115.

The management service 123 can interact with one or more client applications 132 executed on the client device 115 to perform management functions. In one example, the management service 123 can interact with the agent application 137 to enroll a client device 115 with the management service 123. When enrolled, the agent application 137 can be registered as a device administrator of the client device 115, which can provide the agent application 137 with sufficient privileges to control the operation of the client device 115. In one example, the agent application 137 can be registered as the device administrator through the installation of a management profile at an operating system 153 that causes the operating system 153 to designate the agent application 137 as the device administrator.

The management service 123 can direct the agent application 137 to perform various device management functions on the client device 115. For example, the management service 123 can direct the agent application 137 to control access to certain software or hardware functions available on the client device 115. As a result, the management service 123 can verify that the configuration and operation of the client device 115 is in conformance with predefined criteria that ensures that enterprise data 138 or other data, is protected from data loss, unauthorized access, or other harmful events. In one embodiment, among others, the management service 123 can instruct the agent application 137 to set configuration settings for the front-end application 135.

The management service 123 further provision enterprise data 138 to the client device 115 through the agent application 137. In one example, the management service 123 can cause the agent application 137 to control use of the client device 115, the front-end application 135, or provision enterprise data 138 to the client device 115, through use of a command queue provided by the management service 123. In some examples, the management service 123 can store commands in a command queue associated with a particular client device 115 and can configure the agent application 137 executed by such client device 115 to retrieve the contents of the command queue. In one example, the agent application 137 can be configured to retrieve the contents of the command queue on a configured interval, such as every four hours, or upon detection of a certain event, such as an unauthorized application being executed by the client device 115. The management service 123 can also push commands to the agent application 137 over the network 118.

In any case, the agent application 137 can receive the contents of the command queue from the management service 123. In one example, the contents of the command queue can include a command that the agent application 137 should cause to be executed on the client device 115. In another example, the contents of the command queue can include a resource or a client application 132 that the agent application 137 should cause to be installed on the client device 115, which the client device 115 can access through a specified uniform resource locator (URL).

The application proxy service 126 can serve as a gateway for data communicated between the voice application service 160 executed in the back-end device 109 and individual application services executed in either the management system 106 or the remote computing device 112. Specifically, the application proxy service 126 can operate as a gateway between the voice application service 160 and one or multiple restricted application services 129. Also, the application proxy service 126 can operate as a gateway between the voice application service 160 and one or multiple third-party application service 169. From the perspective of the voice application service 160, the application proxy service 126 is an application service. In other words, the application proxy service 126 appears as a voice-drive application to the voice application service 160.

The application proxy service 126 can enforce the compliance rules 143 as it exchanges input data from the voice application service 160 and response data from one or a combination of the restricted application services 129 and the third-party application services 169. Particularly, the application proxy service 126 can maintain an application proxy service session between the voice application service 160 and the application proxy service 126. The application proxy service session can be a semi-permanent data exchange in which data is communicated between the voice application service 160 and the application proxy service 126.

The application proxy service 126 can also maintain an application session with a combination of one or multiple restricted application service(s) 129 or third-party application service(s) 169. The application session can be a semi-permanent data exchange in which data is communicated between the application proxy service 126 and individual application services, such as the restricted application services 129 or the third-party application services. Each application service can have its own application session with the application proxy service 126.

The restricted application service(s) 129 executes a requested task from the captured audio input and generates response data that is transmitted by way of the application proxy service 126 to the voice application service 160. The response data is then relayed to the client device 115 for playback in audio form. The restricted application service(s) 129 can be restricted for use to authenticated users. The restricted application service(s) 129 can also execute tasks intended for internal use within a corporate setting. To this end, the restricted application service(s) 129 can apply a compliancy policy of an enterprise to restrict data access and portions of functionality of the application service based on access privileges of the user. An example of a restricted application service 129 can include a chat application that allows for collaborative instant messaging among co-workers. In this example, a voice-driven version of the chat application can monitor communications to ensure a compliancy policy is enforced because the messaging service may be used to discuss projects involving confidential data. As another non-limiting example, the restricted application service(s) can be an Alexa™ Skill in Amazon's Alexa environment that is managed by a compliance policy of an enterprise. Other examples may include voice application services for workplace automation, such as voice-enabled control of meeting room lights, telephones, media projectors, and other suitable workplace items. The audio input received by the back-end device 109 can comprise an utterance of an application service identifier and a command. The application service identifier can be associated with the application proxy service 126. The command can be mapped to a restricted application service 129 or a third-party application service 169.

The data stored in the data store 120 can include, for example, enterprise data 138, device data 140, compliance rules 143, user account data 146, as well as other data. The enterprise data 138 can include email, corporate documents, social media, messages, enterprise applications, and other enterprise content or communications. The management service 123 can be employed to manage and control access to the enterprise data 138 associated with an enterprise. The management service 123 can provide systems and applications with access based on user accounts, user groups, device data 140, compliance rules 143, and other information.

The device data 140 can include indications of the state of the client device 115. In one example, these indications can specify applications that are installed on the client device 115, configurations or settings that are applied to the client device 115, user accounts associated with the client device 1015, the physical location of the client device 115, the network to which the client device 115 is connected, and other information describing the current state of the client device 115.

The user account data 146 can include information pertaining to end users of the client devices 115 enrolled with the management service 123. For instance, the user account data 146 can include data used to authenticate an end user, such as a username, password, email address, biometric data, device identifier, registry identifier, or other data. Additionally, the user account data 146 can include other information associated with an end user, such as name, organization unit, or other information. Each user account can be associated with a particular entity, such as an enterprise, employer, or other entity.

The compliance rules 143 can include hardware, software, and data access restrictions according to a compliance policy. The compliance policy can be configured by an administrator of an enterprise. The data access restrictions can relate to which data is allowed to pass through the application proxy service 126 and to the voice application service 160. Some data access restrictions can be based on access levels assigned to a user. For example, sensitive data, such as confidential data, may only be accessible for users assigned with a particular access level. In other cases, the department the user works in can determine what data the user can access through the application proxy service 126.

In addition, the compliance rules 143 can also include constraints specified by an administrator for compliance of the client device 115 with the management service 123. In one example, the agent application 137 can configure hardware or software functionality of a client device 115 such that the client device 115 is in conformance with the compliance rules 143. For instance, an administrator can specify whether Bluetooth®, camera, microphone, or related functions are permitted on the client device 115. Additionally, the agent application 137 can identify when the client device 115 is not in compliance with the compliance rules 143, as well as other policies, and can take appropriate remedial actions, such as denying access to enterprise data 138, restricting access to particular networks, or enabling or disabling other functionality of the client device 115 of the agent application 137.

The client device 115 can be representative of one or more client devices 115. The client device 115 can include a processor-based system, such as a computer system, that can include a desktop computer, a speaker system, a laptop computer, a personal digital assistant, a cellular telephone, a smartphone, a set-top box, a music player, a tablet computer system, a game console, an electronic book reader, or any other device with like capability. The client device 115 can also be equipped with networking capability or networking interfaces, including a localized networking or communication capability, such as a near-field communication (NFC) capability, radio-frequency identification (RFID) read or write capability, or other localized communication capability.

The client device 115 can include an operating system 153 configured to execute various client applications 132, such as the agent application 137, a front-end application 135, and any other client applications 132. Some client applications 132 can access network content served up by the management system 106 or other servers, thereby rendering a user interface on a display, such as a liquid crystal display (LCD), touch-screen display, or other type of display device. To this end, some client applications 132 can include a web browser or a dedicated application, and a user interface can include a network page, an application screen, or other interface. Further, other client applications 132 can include device management applications, enterprise applications, social networking applications, word processors, spreadsheet applications, media viewing applications, or other applications.

In some examples, at least a portion of the client applications 132 are "managed applications" where the agent application 137 oversees or controls operation of the client applications 132. For instance, using an administrator console, an administrator of the management service 123 can distribute, secure, and track client applications 132 installed on client devices 115 enrolled with the management service 123. In some examples, the agent application 137 can configure and verify that managed applications operate in conformance with the compliance rules 143.

The client device 115 can also include a microphone 150, a speaker 154, and a data store 156. The microphone 150 can be used to capture audio input from a user, and the speaker 154 can be used for audio playback of responses from the voice application service 160. The data store 156 can include memory of the client device 115 or any other storage resources on which data can be stored by the client device 115. The data store 156 can include the client application 132, and the agent application 137. The data stored in the data store 156, for example, can be associated with the operation of the various applications or functional entities described below.

The front-end application 135 can operate as an audible personal assistant that solicits audio input from users, such as utterances of verbal instructions and/or questions. The front-end application 135 can capture the audio input using the microphone 150 and transmit the audio input to the back-end device 109 for processing. Some non-limiting examples of a front-end application 135 can include Google's Assistant™, Amazon's Alexa™, Apple's Siri™, Microsoft's Cortana™, or other suitable personal assistant client-side applications.

The agent application 137 can render an enterprise workspace environment on a display of the client device 115. The enterprise workspace environment can allow users to enable and disable restricted voice application services 129 and/or third party application service(s) 169.

The back-end device 109 can process the audio input received from the client device 115 and transmit a processed request of the audio input to an appropriate application service. The back-end device 109 can include a server computer or any other system providing computing capability. Alternatively, the back-end device 109 can include a plurality of computing devices that are arranged, for example, in one or more server banks, computer banks, or other arrangements. The computing devices can include a grid computing resource or any other distributed computing arrangement. The computing devices can be located in a single installation or can be distributed among many different geographical locations. The computing device can also include or be operated as one or more virtualized computer instances. For purposes of convenience, the back-end device 109 is referred to in the singular. Even though the back-end device 109 is referred to in the singular, it is understood that a plurality of computing devices can be employed in the various arrangements as described above. As the back-end device 109 communicates with the client device 115 remotely over the network 118, the back-end device 109 can be described as a remote computing device or a collection of one or more remote computing devices.

The back-end device 109 can execute a voice application service 160. The voice application service 160 can process the audio input received from the front-application 135 and transmit a structured request to one of the third party application services 169 and/or the application proxy service 126. In other words, the voice application service 160 can be considered as a network-connected voice service. For example, Amazon's client-side Alexa™ application can capture an audio input on the client device 115 and transmit the audio input to a back-end device 109, where a voice application service 160 processes the audio input. The back-end device 109 can also include a data store 166 that includes audio data 167. The audio data 167 relates to translating audio input into text, parsing the text, and mapping the text to the appropriate application service based on identifying a service identifier within the parsed text.

The remote computing device 112 executes a third party application service 169. The third party application service(s) 169 can execute a requested task. The execution of the task can generate response data that is transmitted to the front-end application 135 for playback through the speaker 154. A non-limiting example of third-party application service(s) 169 can include Amazon's Alexa™ Skill Applications. In this example, the user can utter, "Alexa, what is the weather forecast for today?" This captured audio input can be transmitted to the voice application service 160 for processing, and the voice application service 160 can transmit a structured request to a third-party application service 169, such as a weather forecasting service. The remote computing device 112 can include a data store 172. The data store 172 can include application data 175 that is used to execute a requested command and generate data that is intended for transmission to the client device 115. Continuing from the previous example, the weather forecasting service can receive the request for forecast information and generate a reply that is sent to the voice application service 160, which can be relayed to the client device 115.

Next, a general description of the operation of the various components of the networked environment 100 is provided. To begin, a user can provide audio input to a client device 115, such as a smart speaker, a mobile device, or a personal assistant device. The audio input can be an utterance identifying the voice application service 160 ("Personal Assistant"), identifying the application proxy service 126 ("Enterprise 123"), and providing a command ("Open"). For example, the utterance can include "Personal Assistant, open Enterprise 123." The voice application service 160 can translate the utterance to text, parse the text, and identify "Enterprise 123" as an application service identifier from the parsed text. The voice application service 160 can identify that "Enterprise 123" is associated with the application proxy service 126. The voice application service 160 can then send a request to the application proxy service 126 to initiate an application proxy service session. The application proxy service 126 can acknowledge the request and confirm to the voice application service 160 that an application proxy service session has been initiated. The voice application service 160 can transmit an audio response to the client device 115 that the "Enterprise 123" application service has been opened.

The application proxy service 126 can identify a user account associated with the request and/or the application proxy service session. The identification can be based on identifying the user account from the request, identifying the user account from a device identifier associated with the client device, a single sign-on process, or other suitable methods for automatic identification of a user account. In some embodiments, the user can provide additional audio input that comprises a user name and password. The audio input of the user name and password can be transmitted to the application proxy service 126. In some embodiments, the application proxy service 126 can authenticate the user account for the client based on an identity directory of authorized users. The application proxy service 126 can verify that the user account is an authorized user and can note the access level assigned to the user account. The access level can indicate which restricted application services 129 and which third-party application services 169 the user can access. Even further, the access level can indicate which data for these services the user is allowed to access.

After receiving audio confirmation of being authenticated, the user can respond with additional audio input for opening a specific application service and a command for the application service. For example, the user can utter "Personal Assistant, tell Enterprise 123 to open my Outlook." After the audio input is processed and forwarded to the application proxy service 126, the application proxy service 126 can initiate an application session with the restricted application service 129 associated with the application service identifier "Outlook." The application session can be linked with the application proxy session. Data transmitted from the application session can be inspected and/or filtered to determine that the transmitted data is in compliance with the compliance rules 143. After being inspected, the application proxy service 126 can forward the inspected data to the client device 115 through the voice application service 160.

Continuing with the previous example, the user at the client device 115 can receive an audio response that indicates that the user account for his or her Outlook is opened. The user can then state "Personal Assistant, tell Enterprise 123 to read unopened email." The restricted application service 129, Outlook in this example, can receive the request and transmit response data that includes unopened emails from the user's email account. The application proxy service 126 can inspect the response data for compliance with the compliance rules 143. If the response data does not violate the compliance rules 143, the response data can be transmitted to the voice application service 160 and relayed to the client device 115 for playback through the speaker 154.

In other scenarios, the user can request access to data that does violate the compliance rules 143. In this scenario, the application proxy service 126 can generate a response that filters out the data that violates the compliance rules 143. Alternatively, the application proxy service 126 can generate a response that indicates that the request has been denied because it violates the compliance rules 143 configured by an administrator of an enterprise.

Figure 2A:
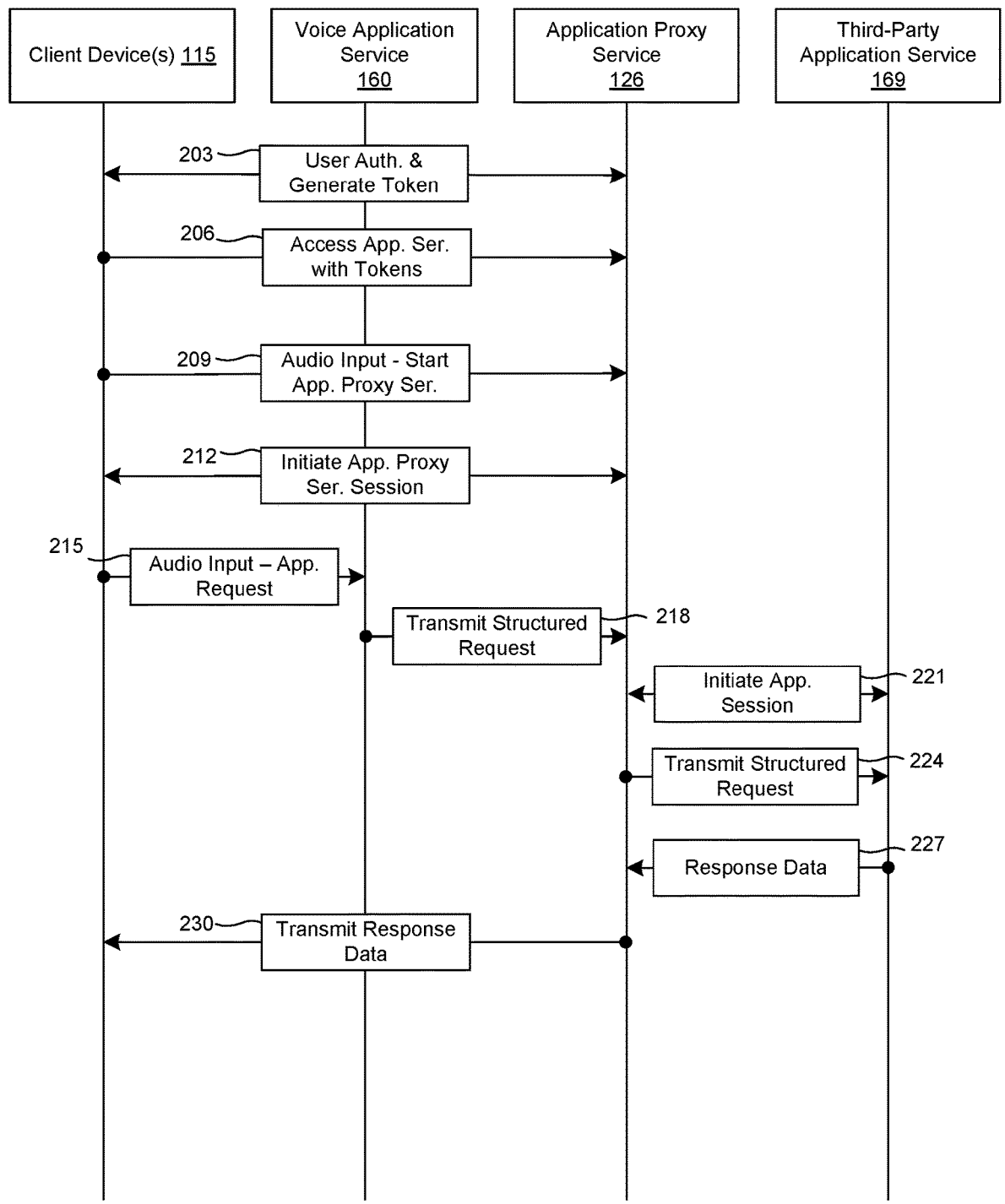
FIGS. 2A and 2B are example sequence diagrams illustrating functionality implemented by components of the networked environment.

With reference to FIG. 2A, shown is an example of a sequence diagram illustrating functionality implemented by components of the networked environment 100. Particularly, FIG. 2A illustrates a sequence for configuring an application proxy service session between the voice application service 126 and the application proxy service 126. In addition, FIG. 2A illustrates a sequence for configuring an application session between the application proxy service 126 and a third party application service 169. The application proxy service session is linked with the application session.

Starting with step 203, the client device 115 proceeds with an authentication process and an account linking process. Step 203 can represent a user on a client device 115, such as a smartphone, enabling the application proxy service 126 on a user interface rendered on the client device. The user interface can allow a user to enable/disable the application proxy service 126, for example similar to enabling an Alexa Skill on the Amazon™ Alexa application. After the application proxy service 126 is enabled, the application proxy service 126 can render on a website on the client device 115 for entering a login name and password. After receiving the login credentials, the application proxy service 126 can authenticate the user using an identity service associated with the application proxy service 126. After authenticating the user, the application proxy service 126 can generate an access token and transmit the access token to the client device 115. The access token can be stored in the voice application service 126 and the client device 115. As a result, a first user account for the user associated with the voice application service 160 is linked to a second user account for the user that is associated with the management system 106. At step 206, the access token can be used by the client device 115 to access third-party application service(s) 169 and/or restricted application service(s) 129.

At step 209, the user can initiate an application proxy service session with the application proxy service 126. The client device 115 can capture an utterance from the user that includes an identifier for the application proxy service 126 and a command. For example, the user can state "Personal Assistant, start Enterprise 123." The captured audio input can be transmitted as a request to the voice application service 160. The client device 115 can also transmit the access token along with the captured audio input in the request. The voice application service 160 can convert the audio input into a structured text request. The voice application service 160 can parse the structured text request and identify that "Enterprise 123" is associated with the application proxy service 126. The voice application service 160 can transmit the structured text request to the application proxy service 126, where the structured text request can include the access token as well. The application proxy service 126 can authenticate the structured request based on the access token.

At step, 212, after authenticating the request, the application proxy service 126 can initiate an application proxy service session with the voice application service 160. The application proxy service session can provide a data session through which data is exchanged between the voice application service 160 and the application services. The data exchanged through the application proxy service session is analyzed to determine whether the exchanged data complies with the compliance rules 143 and the access level assigned to the user.

At step 215, the client device 115 can capture an audio input of a command associated with a third-party application service 169 and/or a restricted application service 129. For example, the client device 115 can capture a user uttering "Personal Assistant, read unread emails." The client device 115 can transmit the captured audio input to the voice application service 160. At step 218, the voice application service 160 can process the audio input and convert the audio input into a structured request. Particularly, the voice application service 160 can convert the audio input into text and transmitted a structured request of the text to the application proxy service 126.

At step 221, the application proxy service 126 can authenticate the structured request based on the access token transmitted with the structured request. The application proxy service 126 can parse the text in the structured request to identify a command "read unopened emails" that is associated with a third-party application service 169 "Outlook." The application proxy service 126 can initiate an application session with the identified third-party application service 160, such as Outlook. The application proxy service 126 can receive additional request and input data from the voice application service 160 by way of the application proxy service session. The additional request and input data can be derived from additional audio input captured by the client device 115. The application proxy service 126 enforce the compliance rules 143 on the additional requests and input data before transmitting a structured request to the third-party application service 169.

At step 224, the application proxy service 126 can transmit the structured request to the third-party application service 169 by way of the application session. As discussed previously, the structured request can include a command associated with the third-party application service 169. The third-party application service 169 can execute a task associated with the command.

At step 227, the third-party application service 169 can generate response data upon executing the task. Continuing with the previous example, the response data can include unread email from the user's Outlook account. The response data can be transmitted through the application session to the application proxy service 126. At which, the application proxy service 126 can determine whether the transmitted response data complies with the compliance rules 143 and/or an access level assigned to the user. At step 230, after being inspected, the application proxy service 126 can transmit the response data to the voice application service 160 through the application proxy service session. The voice application service 126 can relay the response data to the client device 115 for playback through its speakers 154.

Figure 2B:
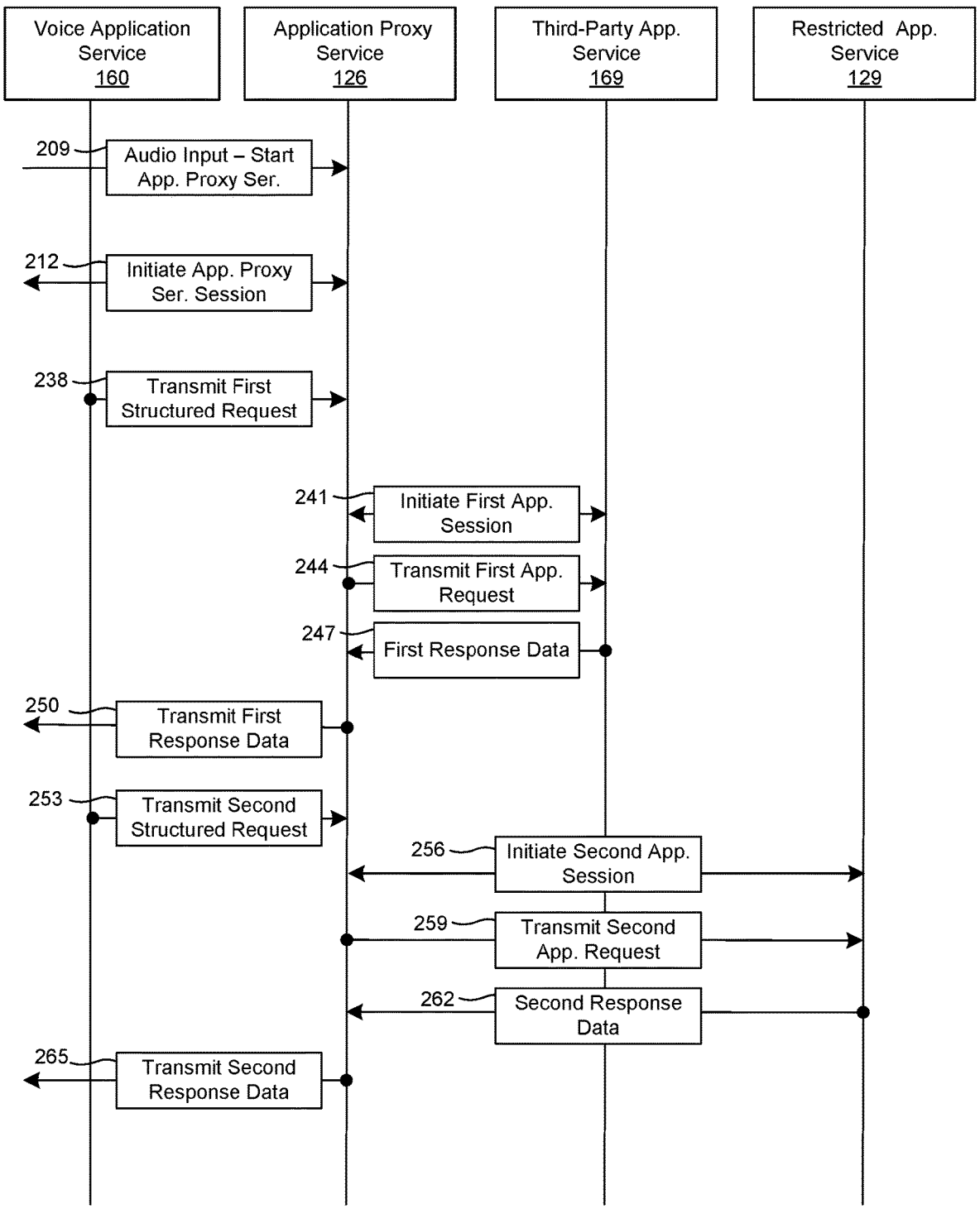

With reference to FIG. 2B, shown is shown is an example of a sequence diagram illustrating functionality implemented by components of the networked environment 100. Particularly, FIG. 2B illustrates a sequence for configuring an application proxy service session that serves as a gateway for a first application session associated with a third-party application service 169 and a second application session associated with a restricted application service 129.

FIG. 2B assumes steps 203 and 206 with regard to authentication and generation of an access token have been executed, as illustrated in FIG. 2A. Next, similar to FIG. 2A, steps 209 and 212 represent capturing an audio input that requests starting an application proxy service session and initiating an application proxy service session after validating the request.

Steps 238 through 250 are similar to steps 218 through 230 in FIG. 2A. Steps 238 through 250 represent a sequence for capturing a first audio input from a client device 115. The audio input includes a command for executing a task associated with the third-party application service 169. The third-party application service 169 generates response data and transmits the response data by way of the application session to the application proxy service 126. The application proxy service 126 can analyze the response data to ensure that it complies with the compliance rules 143. The application proxy service 126 can transmitted the inspected response data to the voice application service 60 by way of the application proxy service session.

Next, assume the client device 115 captures a second audio input for a command associated with the restricted application service 129. The captured audio input can be transmitted to the voice application service 160 for processing. At step 253, the voice application service 160 can process the audio input and transmit a second structured request to the application proxy service 126 by way of the application proxy service session. At step 256, the application proxy service 126 can authenticate the structured request by validating the access token associated with the request. The application proxy service 126 can identify that the command associated with the restricted application service 129. Then, the application proxy service 126 can initiate a second application session with the restricted application service 129. The restricted application service 129 can be an application service that is managed within the management system 106. Some examples of a restricted application service 129 can include an internal collaborative instant message service, a sales reporting tool, internal training tools, or other suitable restricted application services managed by an enterprise.

At step 259, the application proxy service 126 transmits a second application request for executing a command from the second audio input. The restricted application service (129) can authenticate the request based on the access token provided to the user of the client device 115.

At step 262, after authenticating the second application request, the restricted application service 129 can execute a task associated with the command from the audio input. The execution of the task can generate second response data that is intended to be transmitted to the client device 115. The second response data can be transmitted to the application proxy service 126 for analysis.

At step 265, the application proxy service 126 can analyze whether the second response data complies with the compliance rules 143 and the user is permitted access to the data according to an access level assigned to the user account of the user. After inspecting the data, the application proxy service 126 can transmit the second response data to the voice application service 160. The voice application service 160 can transmit the second response data to the client device 115 for playback through its speakers.

FIG. 2B illustrates that the application proxy service 126 maintains one application service session with the voice application service 160, and the application proxy service 126 can manage individual application sessions for the third-party application service 169 and the restricted application service 129. Although FIG. 2B illustrates only two application sessions, one skilled in the art can appreciate that the number of application sessions can vary to correspond with a combination of varying number of the restricted application services 129 and/or the third-party application services 169.

Figure 3:
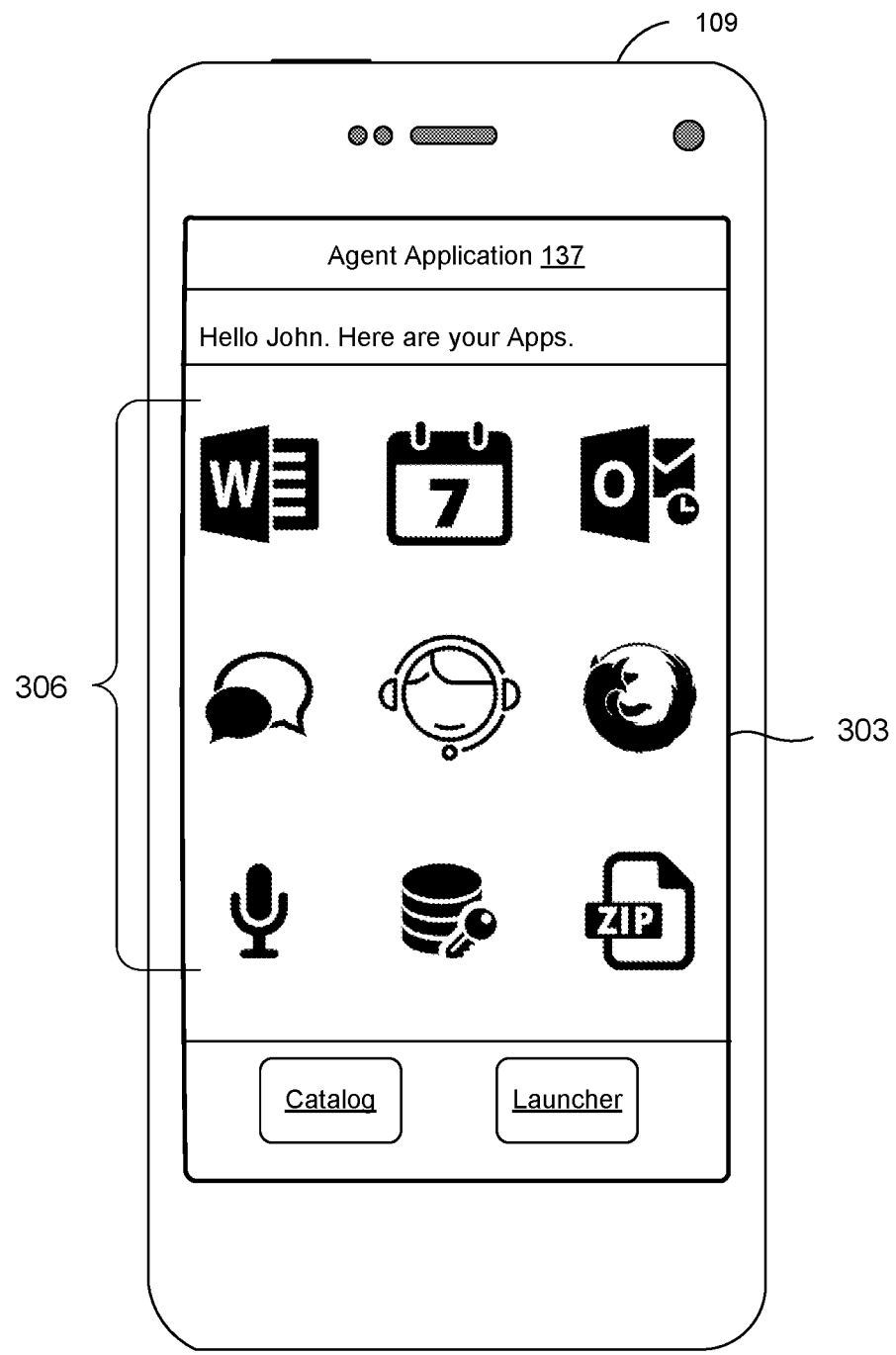
FIG. 3 is an example user interface illustrating functionality implemented by the client device.

With reference to FIG. 3, shown is an example user interface of the agent application 137 executed on the client device 115. FIG. 3 illustrates a user interface agent application 303 that depicts multiple application icons 306. Each application icon 306 can represent a third-party application service 169 or a restricted application service 129. The user interface agent application 303 can be used to enable/disable individual application services. In addition, the user interface agent application 303 can operate as an enterprise workspace environment for the client device 115. The user interface agent application 303 can be used to configure the settings associated with the individual application services.

Figure 4:
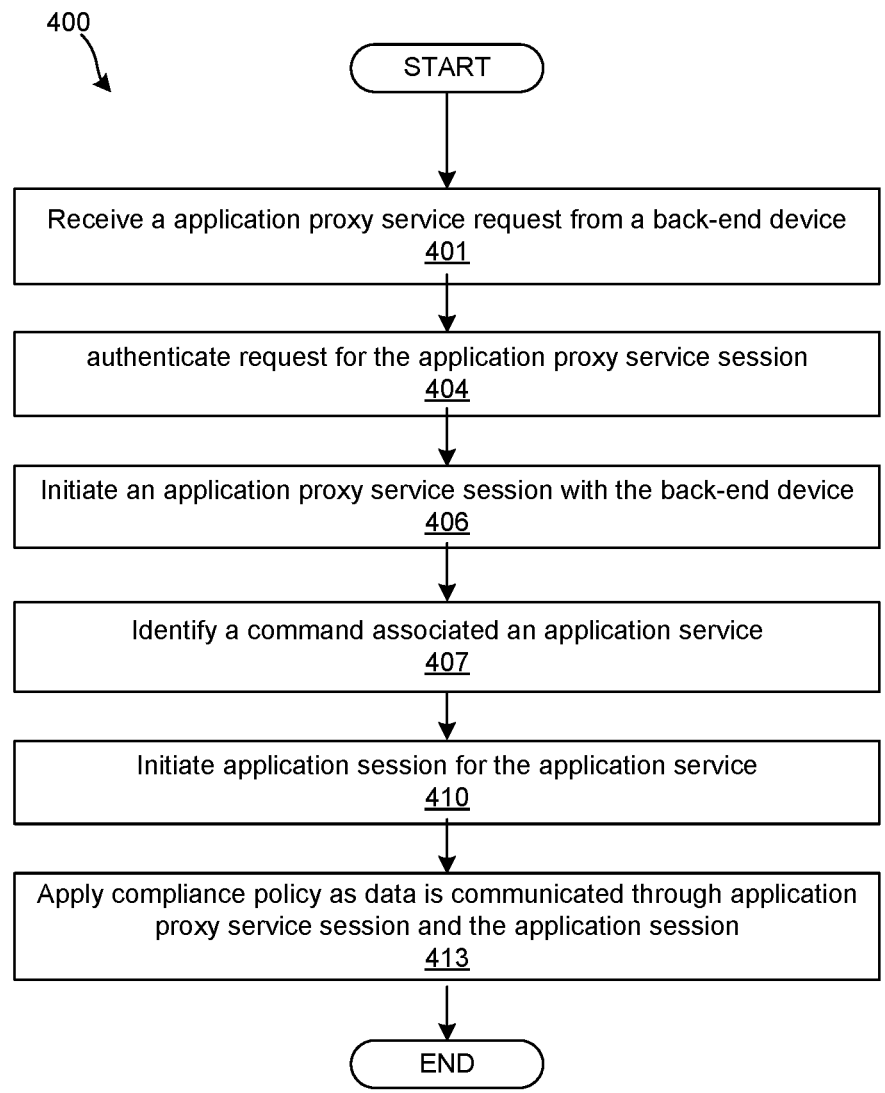
FIG. 4 is an example flowchart illustrating functionalities implemented by an application proxy service executed in the management system.

Referring next to FIG. 4, shown is a flowchart 400 that provides one example of the operation of a portion of the application proxy service 126 according to various embodiments. It is understood that the flowchart 400 of FIG. 4 provides merely an example of the many different types of functional arrangements that can be employed to implement the operation of the portion of the application proxy service 126 as described herein.

Beginning with step 401, the application proxy service 126, being executed in the management system 106, can receive a request from a back-end computing device 109 to initiate an application proxy service 126. The request can be routed to the management system 106 based at least in part on audio input received by the back-end computing device 109.

In step 404, the application proxy service 126 can identify and authenticate a user account of a user based on an access token associated with the request. The access token can be authenticated based on using an identify directory associated with an enterprise. In some embodiments, the user can be authenticated based on a single-sign process, which enables the user access to a set of restricted application service(s) 129 and third-party application service(s) 169 after authenticating the access token associated with the user.

In step 406, the application proxy service 126 can initiate an application proxy service session with the back-end computing device 109 for the application proxy service 126. Next, in step 407, the application proxy service 126 can identify a command from the structured request sent by the voice application service 160.

In step 410, the application proxy service 126 can initiate an application session associated with an application service based at least in part on identifying the command as being associated with the application service. The application service can be a third-party application service 169 or a restricted application service 129. The application service executes a command associated with the request. The application proxy service 126 can manage multiple application sessions associated with individual application services.

In step 413, the application proxy service 126 can apply a compliance policy as data is communicated between the back-end computing device and the application service. The data is communicated through the application proxy service session and the application session. In some embodiments, as data is communicated, the application proxy service 126 can filter response data from the application service in order to comply with the compliance policy. This filtering can occur prior to the application proxy service 126 transmits the response data to the voice application service 160. Then, the application proxy service 126 proceeds to the end of this process.

The client devices 115 or devices comprising the management system 106 can include at least one processor circuit, for example, having a processor and at least one memory device, both of which couple to a local interface, respectively. The client device 115 can include, for example, at least one computer, a mobile device, smartphone, a table computer, a speaker system, a personal assistant device, a computing device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In this case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 115 can include a display upon which user interface(s) generated by the client application(s) 132, the front-end application 135, the agent application 137, or another application can be rendered. The client device 115 can also include one or more input/output devices that can include, for example, a capacitive touchscreen or other type of touch input device, fingerprint reader, or keyboard.

Although the management service 123, the client applications 132, the agent application 137, the front-end application 135, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show examples of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system, comprising:
   at least one computing device that comprises a processor and memory; and
   program instructions executable in the at least one computing device that, when executed by the at least one computing device, cause the at least one computing device to:
   receive, over a network, a request from a voice application service to initiate an application proxy service, wherein the request is generated by the voice application service based on an audio input, and the audio input is provided to the voice application service by a client device;
   initiate an application proxy service session between the voice application service and the application proxy service, wherein the voice application service provides input data to the application proxy service by way of the application proxy service session based at least in part on the audio input;
   initiate an application session between an application service and the application proxy service based at least in part on the input data, the application proxy service providing the input data to the application service by way of the application session, the application service executing a command associated with the input data, wherein the execution of the command generates response data; and
   apply, via the application proxy service, a compliance policy as the input data and the response data are communicated between the voice application service and the application service, wherein applying the compliance policy comprises determining that the input data and the response data are in compliance with the compliance policy before transmitting the input data and the response data between the voice application service and the application service.

2. The system of claim 1, further comprising program instructions executable in the at least one computing device that, when executed, further cause the at least one computing device to:
   receive, by way of the application session, the response data from the application service; and
   transmit the response data to the voice application service in response to determining that the response data does not violate the compliance policy, the voice application service transmitting the response data to the client device, the client device generating an audio output of the response data.

3. The system of claim 1, wherein the audio input comprises an utterance of an application service identifier and the command.

4. The system of claim 3, wherein the application service identifier comprises a first application service identifier associated with the application proxy service, and the command comprises a second application service identifier associated with the application service.

5. The system of claim 1, wherein the application session comprises a plurality of application sessions that are linked to the application proxy service session, and the application service comprises a plurality of restricted application services and a plurality of third-party application services, individual ones of the plurality of application sessions are respectively associated with individual ones of the plurality of third-party application services and individual ones of the plurality of restricted application services.

6. The system of claim 1, wherein applying the compliance policy further comprises restricting access to a portion of the application service based at least in part on an access level associated with a user account.

7. The system of claim 1, wherein applying the compliance policy further comprises restricting a second request from the client device to transmit the response data to a remote computing device.

8. A non-transitory computer-readable medium embodying program instructions executable in at least one computing device that, when executed by the at least one computing device, cause the at least one computing device to:

receive, over a network, a request from a voice application service to initiate an application proxy service, wherein the request is generated by the voice application service based on an audio input, and the audio input is provided to the voice application service by a client device;

initiate an application proxy service session between the voice application service and the application proxy service, wherein the voice application service provides input data to the application proxy service by way of the application proxy service session based at least in part on the audio input;

initiate an application session between an application service and the application proxy service based at least in part on the input data, the application proxy service providing the input data to the application service by way of the application session, the application service executing a command associated with the input data, wherein the execution of the command generates response data; and apply, via the application proxy service, a compliance policy as the input data and the response data are communicated between the voice application service and the application service, wherein applying the compliance policy comprises determining that the input data and the response data are in compliance with the compliance policy before transmitting the input data and the response data between the voice application service and the application service.

9. The non-transitory computer-readable medium of claim 8, wherein applying the compliance policy further comprises restricting access to a portion of the application service.

10. The non-transitory computer-readable medium of claim 8, wherein applying the compliance policy further comprises restricting a second request to transmit the response data to a remote computing device.

11. The non-transitory computer-readable medium of claim 8, wherein the audio input comprises an utterance that includes an application service identifier and the command.

12. The non-transitory computer-readable medium of claim 8, wherein the application session comprising a plurality of application sessions that are linked to the application proxy service session.

13. The non-transitory computer-readable medium of claim 8, wherein the program instructions, when executed, further cause the at least one computing device to:

receive, by way of the application session, the response data from the application service; and transmit the response data to the voice application service in response to determining that the response data does not violate the compliance policy.

14. A computer-implemented method, comprising:

receiving, by at least one computing device over a network, a request from a voice application service to initiate an application proxy service, wherein the request is generated by the voice application service based on an audio input, and the audio input is provided to the voice application service by a client device;

initiating, by the at least one computing device, an application proxy service session between the voice application service and the application proxy service, wherein the voice application service provides input data to the application proxy service by way of the application proxy service session based at least in part on the audio input;

initiating, by the at least one computing device, an application session between an application service and the application proxy service based at least in part on the input data, the application proxy service providing the input data to the application service by way of the application session, the application service executing a command associated with the input data, wherein the execution of the command generates response data; and applying, by the at least one computing device, a compliance policy as the input data and the response data are communicated between the voice application service and the application service, wherein applying the compliance policy comprises determining that the input data and the response data are in compliance with the compliance policy before transmitting the input data and the response data between the voice application service and the application service.

15. The computer-implemented method of claim 14, wherein the audio input comprises an utterance of an application service identifier and the command.

16. The computer-implemented method of claim 15, wherein the application service identifier comprises a first application service identifier associated with the application proxy service, and the command comprises a second application service identifier associated with the application service.

17. The computer-implemented method of claim 14, wherein applying the compliance policy further comprises restricting access to a portion of the application service based at least in part on an access level associated with a user account.

18. The computer-implemented method of claim 14, wherein applying the compliance policy further comprises restricting a request from the client device to transmit the response data to a remote computing device.

19. The computer-implemented method of claim 18, wherein the application session comprising a plurality of application sessions that are linked to the application proxy service session.

20. The computer-implemented method of claim 14, wherein applying the compliance policy further comprises filtering the response data before transmitting the response data from the application proxy service to the voice application service.

* * * * *